(12) United States Patent
Kim et al.

(10) Patent No.: US 12,100,796 B2
(45) Date of Patent: Sep. 24, 2024

(54) APPARATUS AND METHOD FOR MANUFACTURING ELECTRODE ASSEMBLY

(71) Applicant: LG ENERGY SOLUTION, LTD., Seoul (KR)

(72) Inventors: Woong Ki Kim, Daejeon (KR); Sang Don Lee, Daejeon (KR); Sang Uk Yeo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 204 days.

(21) Appl. No.: 17/776,270

(22) PCT Filed: Nov. 9, 2020

(86) PCT No.: PCT/KR2020/015640
§ 371 (c)(1),
(2) Date: May 12, 2022

(87) PCT Pub. No.: WO2021/096183
PCT Pub. Date: May 20, 2021

(65) Prior Publication Data
US 2022/0393222 A1    Dec. 8, 2022

(30) Foreign Application Priority Data
Nov. 13, 2019 (KR) .......................... 10-2019-0145307

(51) Int. Cl.
*H01M 10/04* (2006.01)
*B65H 23/02* (2006.01)
(Continued)

(52) U.S. Cl.
CPC .... *H01M 10/0404* (2013.01); *B65H 23/0204* (2013.01); *B65H 23/032* (2013.01);
(Continued)

(58) Field of Classification Search
CPC ..... B32B 37/02; B32B 37/22; B32B 2309/72; B32B 2041/04; B65H 23/032;
(Continued)

(56) References Cited

U.S. PATENT DOCUMENTS 6,534,952 B1    3/2003 Ishikawa et al.
8,397,372 B2    3/2013 Hor et al.
(Continued)

FOREIGN PATENT DOCUMENTS

CN    1387683 A    12/2002
CN    109802164 A    5/2019
(Continued)

OTHER PUBLICATIONS

English translation of KR2018-0002926 (in IDS filed May 12, 2022 (Year: 2018).*
(Continued)

*Primary Examiner* — Scott W Dodds
(74) *Attorney, Agent, or Firm* — Birch, Stewart, Kolasch & Birch, LLP

(57) ABSTRACT

A method for manufacturing an electrode assembly includes a first combination step of combining a first electrode with an upper portion of a first separator to form a first combination, and a second combination step of combining the first combination so that a second electrode faces the first electrode with the first separator therebetween after the second electrode is stacked on a second separator, wherein the first combination step comprises a first electrode cutting process of moving the first electrode in an X-axis direction that is a progress direction to cut the first electrode to a predetermined size, a first electrode transfer process of transferring the cut first electrode, a first first-electrode position detection process of measuring a Y-axis position of the first electrode, a first separator meandering correction process of moving
(Continued)

the first separator, a first stacking process of stacking the first electrode on the first separator.

13 Claims, 7 Drawing Sheets

(51) Int. Cl.
  *B65H 23/032* (2006.01)
  *B65H 23/038* (2006.01)
  *B32B 27/02* (2006.01)
  *B32B 37/22* (2006.01)
  *B32B 41/00* (2006.01)
(52) U.S. Cl.
  CPC ............ *B65H 23/038* (2013.01); *B32B 27/02* (2013.01); *B32B 37/22* (2013.01); *B32B 2041/04* (2013.01); *B32B 2309/72* (2013.01); *B65H 2701/19* (2013.01)
(58) Field of Classification Search
  CPC .......................... B65H 23/035; B65H 23/038; B65H 23/0204; B65H 23/0208; H01M 10/0404
  See application file for complete search history.

(56) References Cited

U.S. PATENT DOCUMENTS

| | | | |
|---|---|---|---|
| 2010/0212136 A1* | 8/2010 | Hjalmarsson | B65H 39/16 29/700 |
| 2014/0059875 A1 | 3/2014 | Yuhara et al. | |
| 2015/0129107 A1 | 5/2015 | Miyazaki et al. | |
| 2015/0221916 A1 | 8/2015 | Lee et al. | |
| 2016/0087303 A1 | 3/2016 | Un et al. | |
| 2019/0252729 A1* | 8/2019 | Fujiwake | H01M 10/0404 |
| 2019/0252730 A1 | 8/2019 | Fujiwake et al. | |
| 2020/0067051 A1* | 2/2020 | Yamashita | H01M 50/46 |
| 2020/0235433 A1 | 7/2020 | Kim et al. | |
| 2022/0223897 A1* | 7/2022 | Wang | H01M 10/0468 |

FOREIGN PATENT DOCUMENTS

| | | |
|---|---|---|
| CN | 109952678 A | 6/2019 |
| CN | 110168791 A | 8/2019 |
| DE | 102017216184 A1 * | 3/2019 |
| EP | 2 830 139 B1 | 11/2017 |
| JP | 2000-182658 A | 6/2000 |
| JP | 2003-249261 A | 9/2003 |
| JP | 2016-51645 A | 4/2016 |
| JP | 2016-152178 A | 8/2016 |
| JP | WO2018/116542 A1 | 6/2018 |
| JP | WO2018/116543 A1 | 6/2018 |
| JP | WO2018/154776 A1 | 7/2019 |
| KR | 10-2002-0053841 A | 7/2002 |
| KR | 10-1256968 B1 | 4/2013 |
| KR | 10-129265 B1 | 8/2013 |
| KR | 10-2013-0137229 A | 12/2013 |
| KR | 10-2014-0015647 A | 2/2014 |
| KR | 10-2016-0014370 A | 2/2016 |
| KR | 10-2016-0094182 A | 8/2016 |
| KR | 20-2018-0002926 U | 10/2018 |
| KR | 10-2019-0059676 A | 5/2019 |
| KR | 10-2019-0113907 A | 10/2019 |
| KR | 10-2010-0113111 A | 8/2024 |

OTHER PUBLICATIONS

Machine translation of DE102017216184 (Year: 2017).*
International Search Report (PCT/ISA/210) issued in PCT/KR2020/015640 mailed on Feb. 15, 2021.
Supplementary European Search Report for European Application No. 20888359.5, dated Mar. 22, 2024.

* cited by examiner

APPARATUS AND METHOD FOR MANUFACTURING ELECTRODE ASSEMBLY

CROSS-REFERENCE TO RELATED APPLICATION

The present application claims the benefit of the priority of Korean Patent Application No. 10-2019-0145307, filed on Nov. 13, 2019, which is hereby incorporated by reference in its entirety.

TECHNICAL FIELD

The present invention relates to an apparatus and method for manufacturing an electrode assembly.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the case of the conventional stack type electrode assembly, when manufacturing an electrode assembly by stacking and combining electrodes and separators, there has been a problem that meandering occurs due to poor positioning accuracy of the electrodes and the separators.

In addition, as the electrode traveling distance increases, a frequency of the meandering due to the electrode swell increases, and there has been a problem that a long manufacturing time due to manual connection of a worker is required when the electrode is broken.

[Prior Art Document] (Patent Document) Korean Patent Publication No. 10-2014-0015647

DISCLOSURE OF THE INVENTION

Technical Problem

One aspect of the present invention is to provide an apparatus and method for manufacturing an electrode assembly, in which meandering is capable of being corrected when manufacturing the electrode assembly by stacking and combining electrodes and separators.

Technical Solution

A method for manufacturing an electrode assembly according to an embodiment of the present invention comprises a first combination step of combining a first electrode with an upper portion of a first separator to form a first combination and a second combination step of combining the first combination so that a second electrode faces the first electrode with the first separator therebetween after the second electrode is stacked on a second separator, wherein the first combination step comprises a first electrode cutting process of moving the first electrode in an X-axis direction that is a progress direction to cut the first electrode to a predetermined size, a first electrode transfer process of transferring the cut first electrode, a first first-electrode position detection process of measuring a Y-axis position of the first electrode 11, which is a width direction of the first electrode disposed in a path of the first electrode transfer process, a first separator meandering correction process of moving the first separator, which is transferred in the progress direction, to correspond to the Y-axis position of the first electrode, a first stacking process of stacking the first electrode on the first separator, and a first bonding process of bonding the stacked first electrode to the first separator 12 by applying heat and pressure.

An apparatus for manufacturing an electrode assembly according to an embodiment of the present invention comprises a first combination device configured to combine a first electrode with an upper portion of a first separator, thereby forming a first combination, and a second combination device configured to combine the first combination so that a second electrode faces the first electrode with the first separator therebetween after the second electrode is stacked on a second separator, wherein the first combination device comprises a first electrode cutting part configured to move the first electrode in an X-axis direction that is a progress direction so as to cut the first electrode to a predetermined size, a first electrode transfer part configured to transfer the cut first electrode, a first first-electrode position detection part configured to measure a Y-axis position of the first electrode 11, which is a width direction of the first electrode disposed in a path of the first electrode transfer process, a first separator meandering correction part configured to move the first separator, which is transferred in the progress direction, to correspond to the Y-axis position of the first electrode, a first stacking part configured to stack the first electrode on the first separator of which the position is corrected through the first separator meandering correction process, and a first bonding part configured to bond the stacked first electrode to the first separator 12 by applying heat and a pressure.

Advantageous Effects

According to the present invention, when the electrodes and the separators are stacked to be combined with each other so as to manufacture the electrode assembly, the positions of the electrodes and the separators may be detected through the vision sensor to correct the positions, thereby preventing the Y-axis meandering from occurring and improving the positioning accuracy of the electrodes and the separators, and thus, the electrode assembly may be improved in quality.

MODE FOR CARRYING OUT THE INVENTION

Figure 1:
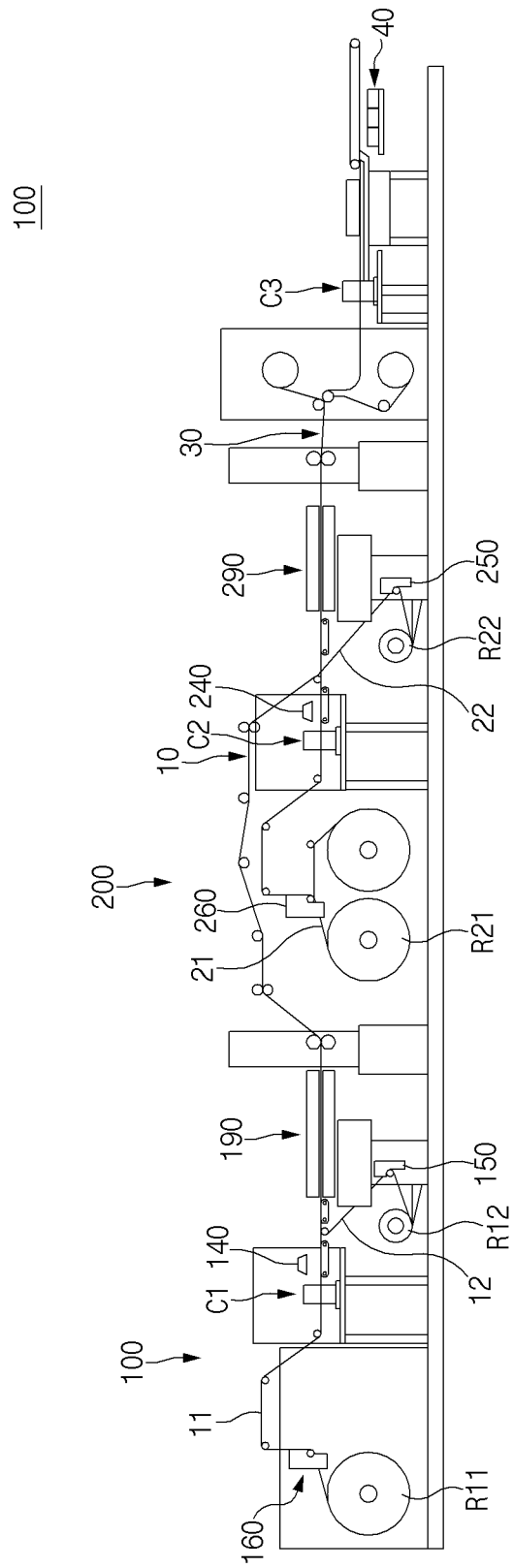
FIG. 1 is a front view exemplarily illustrating an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
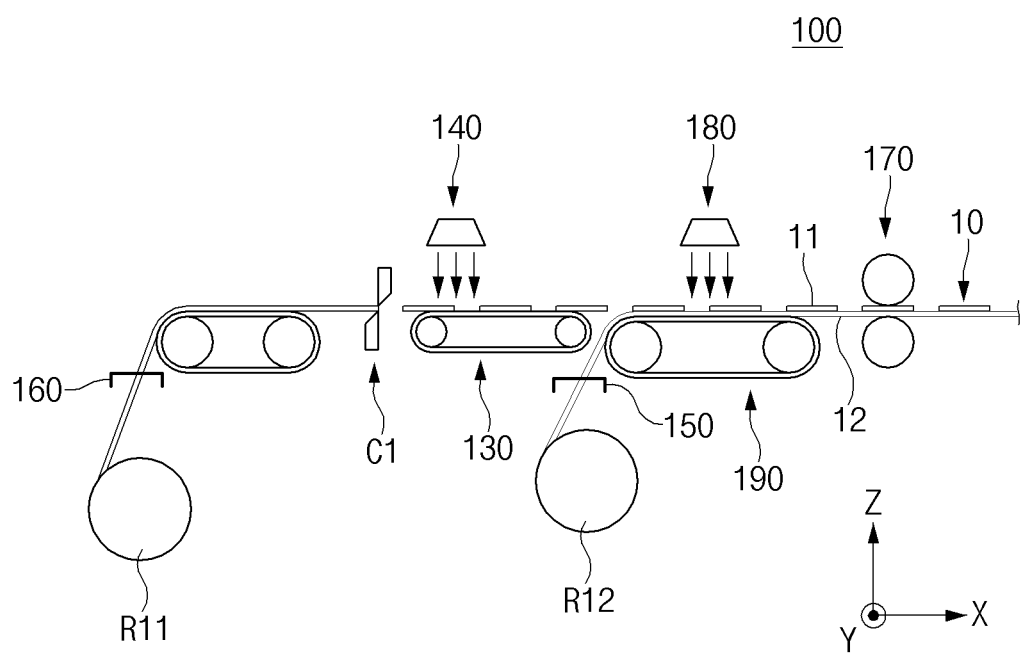
FIG. 2 is a conceptual front view illustrating a first combination device in the apparatus for manufacturing the electrode assembly according to an embodiment of the present invention.

FIG. 1 is a front view exemplarily illustrating an apparatus for manufacturing an electrode assembly according to an embodiment of the present invention, and FIG. 2 is a conceptual front view illustrating a first combination device in the apparatus for manufacturing the electrode assembly according to an embodiment of the present invention.

Referring to FIGS. 1 and 2, a method for manufacturing an electrode assembly according to an embodiment of the present invention comprises a first combination step of forming a first combination 10 and a second combination step of combining the first combination 10 to form a second combination 30. Here, the first combination step comprises a first electrode cutting process of cutting a first electrode 11, a first electrode transfer process of transferring the first electrode 11, a first first-electrode position detection process of measuring a position of the first electrode 11, a first separator meandering correction process of moving a first separator 12 to correspond to the position of the first electrode 11 so as to correct a position of the first separator 12, a first stacking process of stacking the first electrode 11 on the first separator 12 of which the position is corrected, and a first bonding process of bonding the stacked first electrode 11 to the first separator 12. In addition, the first combination step further comprises, after the first stacking process, a second first-electrode position detection process of detecting a deviation of the first electrode 11 and a first electrode meandering correction process of moving the first electrode 11 to correct the positional deviation of the first electrode 11.

Hereinafter, referring to FIGS. 1 to 5, the method for manufacturing the electrode assembly according to an embodiment of the present invention will be described in more detail.

Referring to FIGS. 1 and 2, in the first combination step, the first electrode 11 may be combined with an upper portion of the first separator 12 through a first combination device 100 to form the first combination 10.

In the second combination step, after a second electrode 21 is stacked on an upper portion of a second separator 22, the second electrode 21 may be combined with the first combination through a second combination device 200 so that the second electrode 21 faces the first electrode 11 with the first separator 12 therebetween to form a second combination 30.

In the first electrode cutting process, the first electrode 11 may be moved in an X-axis direction that is a progress direction and then be cut to a predetermined size to form a plurality of first electrodes. Here, in the first electrode cutting process, the first electrode 11 wound around a first electrode winding roll R11 may be unwound to be cut to a predetermined size so as to supply the cut first electrodes 11 in a subsequent process.

In the first electrode transfer process, the cut first electrodes 11 may be transferred. Here, in the first electrode transfer process, for example, the first electrodes 11 may be moved in the progress direction through a conveyor belt.

In the first first-electrode position detection process, a Y-axis position in a width direction of the first electrode 11, which is disposed in a path of the first electrode transfer process, may be measured.

Also, in the first first-electrode position detection process, positions of both ends of the first electrode 11 may be measured through a first master vision sensor that is a first first-electrode position detection part 140 to detect a position of a center of the first electrode 11.

Furthermore, in the first first-electrode position detection process, the position of the center of the first electrode 11 may be detected through the first master vision sensor, and when a deviation from a reference position occurs, a deviation value of the first electrode 11 may be transmitted to a controller C.

Figure 3:
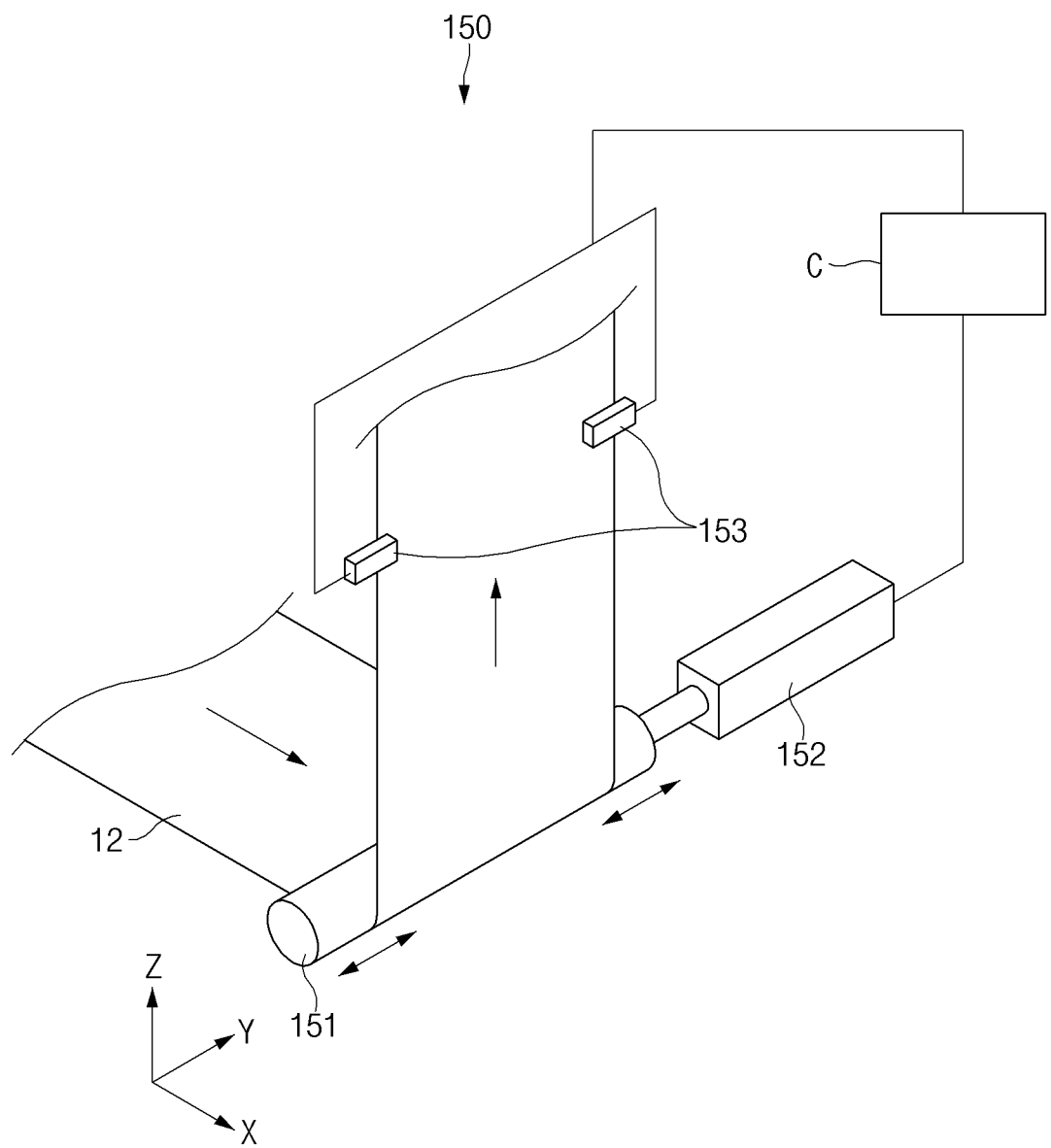
FIG. 3 is a perspective view exemplarily illustrating a first separator meandering correction part in the apparatus for manufacturing the electrode assembly according to an embodiment of the present invention.

FIG. 3 is a perspective view exemplarily illustrating the first separator meandering correction part in the apparatus for manufacturing the electrode assembly according to an embodiment of the present invention.

Referring to FIGS. 2 and 3, in the first separator meandering correction process, the first separator 12 that is transferred in the progress direction to correspond to the Y-axis position of the first electrode 11, which is detected through the first first-electrode position detection process, may be moved to the Y-axis so as to be corrected in position. Here, in the first separator meandering correction process, the first separator 12 wound around a first separator winding roll R12 may be unwound to be moved.

Also, in the first separator meandering correction process, the first separator 12 may be moved to the Y-axis so that a position of a center of the first separator 12 corresponds to the position of the center of the first electrode 11, which is detected in the first first-electrode position detection process, through a first separator meandering correction part 150.

Furthermore, in the first separator meandering correction process, the positions of both the ends of the traveling first separator 12 may be measured through a first separator center position control (CPC) sensor 153 to detect the position of the center of the first separator 12, and a first separator correction roller 151 that is in contact with the traveling first separator 12 may be moved in the Y-axis direction through a first separator actuator 152 to move the first separator 12 so that the position of the center of the first separator 12 corresponds to the position of the center of the first electrode 11, which is detected in the first first-electrode position detection process.

Also, in the first separator meandering correction process, the controller C may control the first separator actuator 152 to move a first separator correction roller 151 so that the first separator 12 is moved to correspond to the deviation value of the first electrode 11.

In the first stacking process, the first electrode 11 may be stacked on an upper portion of the first separator 12 that is corrected in position through the first separator meandering correction process.

In the first first-electrode position detection process, the first electrode 11 and the first separator 12, which is transferred in the progress direction in the first separator meandering correction process, may be moved in the same direction. Thus, when the first separator 12 is moved to the Y-axis in the first separator meandering correction process, the first electrode 11 may be stacked by reflecting a position amount of first separator 12, which is moved to the Y-axis, to the first electrode 11 in the first stacking process in proportion to the movement of the first separator 12.

In a second first-electrode position detection process, after the first stacking process, a position of the first electrode 11 in the Y-axis direction may be measured to detect a deviation from the reference position.

Also, in the second first-electrode position detection process, positions of both ends of the first electrode 11 may be measured through a first feedback vision sensor that is a second first-electrode position detection part 180 to detect a position of a center of the first electrode 11, thereby detecting a deviation from the reference position.

Furthermore, in the second first-electrode position detection process, the positional deviation value of the first electrode 11, which is detected through the first feedback vision sensor, may be transmitted to the controller C.

Figure 4:
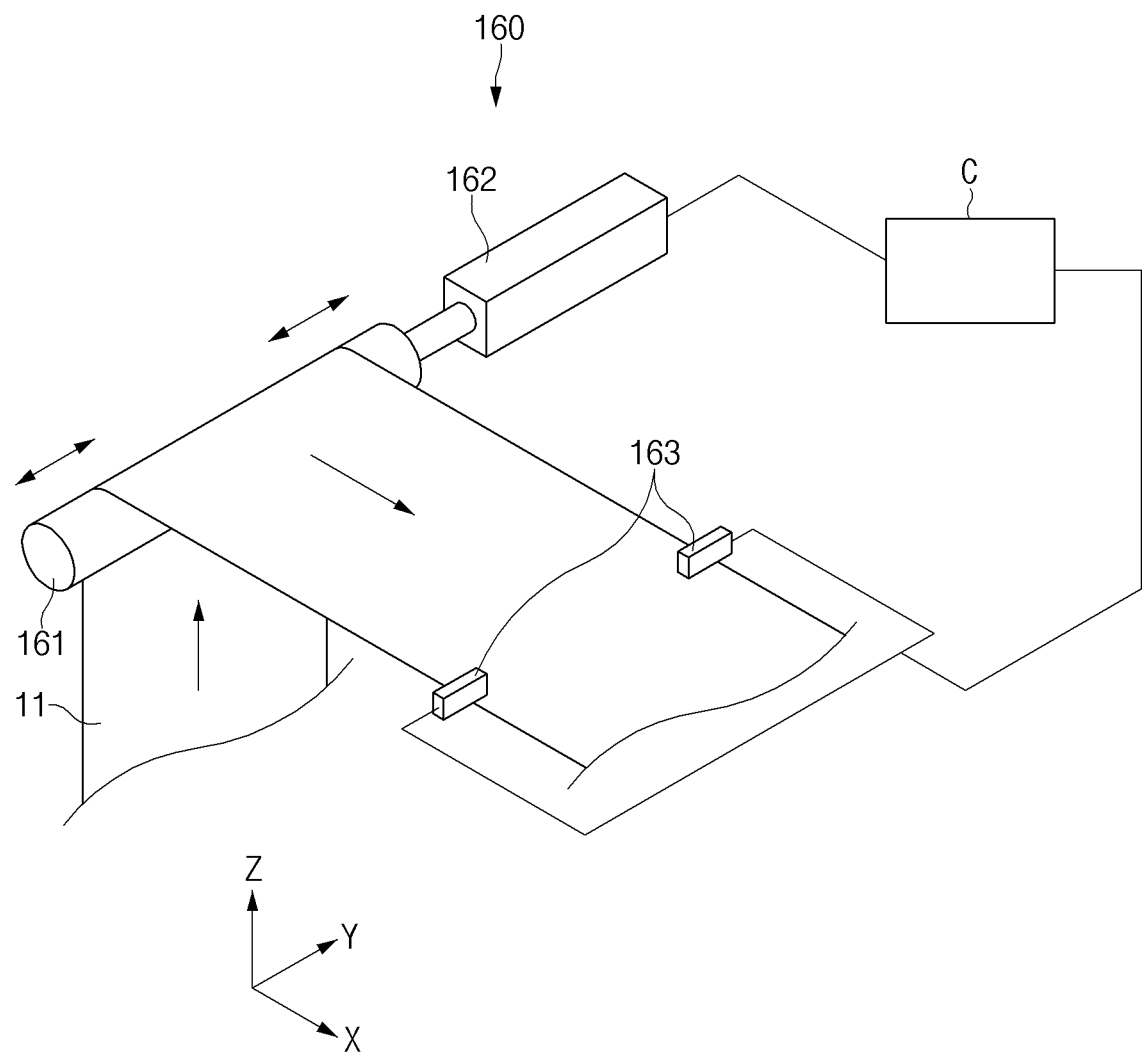
FIG. 4 is a perspective view exemplarily illustrating a first electrode meandering correction part in the apparatus for manufacturing the electrode assembly according to an embodiment of the present invention.

FIG. 4 is a perspective view exemplarily illustrating the first electrode meandering correction part in the apparatus for manufacturing the electrode assembly according to an embodiment of the present invention.

Referring to FIGS. 2 and 4, in the first electrode meandering correction process, the first electrode 11 may be moved in the Y-axis direction to correct the positional deviation of the first electrode 11, which is detected through the second first-electrode position detection process.

Also, in the first electrode meandering correction process, the first electrode 11 may be moved to the Y-axis so that the deviation of the first electrode 11, which is detected in the second first-electrode position detection process, is collected.

Furthermore, in the first electrode meandering correction process, positions of both ends of the traveling first electrode 11 may be measured through a first electrode CPC sensor 163 to detect a position of a center of the first electrode 11, and a first electrode correction roller 161 that is in contact with the traveling first electrode 11 may be moved in the Y-axis direction through a first electrode actuator 162 to move the first electrode 11 so that the deviation of the first electrode 11, which is detected in the second first-electrode position detection process, is corrected.

Also, in the first electrode meandering correction process, the controller C may control the first electrode actuator 162 to move a first electrode correction roller 161 so that the first electrode 11 is moved to correspond to the deviation value of the first electrode 11.

Referring to FIG. 2, in the first bonding process, the stacked first electrode 11 may be bonded to the first separator by applying heat and a pressure.

Here, for example, the first electrode 11 and the first separator may be pressed while pressing between a pair of rollers so as to be bonded to each other.

The first electrode 11 disposed in a path of the second first-electrode position detection process and the first electrode 11 disposed in a path of the first electrode meandering correction process may be moved in the same direction (for example, the X-axis). Thus, the first electrode 11 may be moved to the Y-axis and stacked in the first stacking process in proportion to an amount of the first electrode 11, which is moved along the Y-axis in the first electrode meandering correction process.

Figure 5:
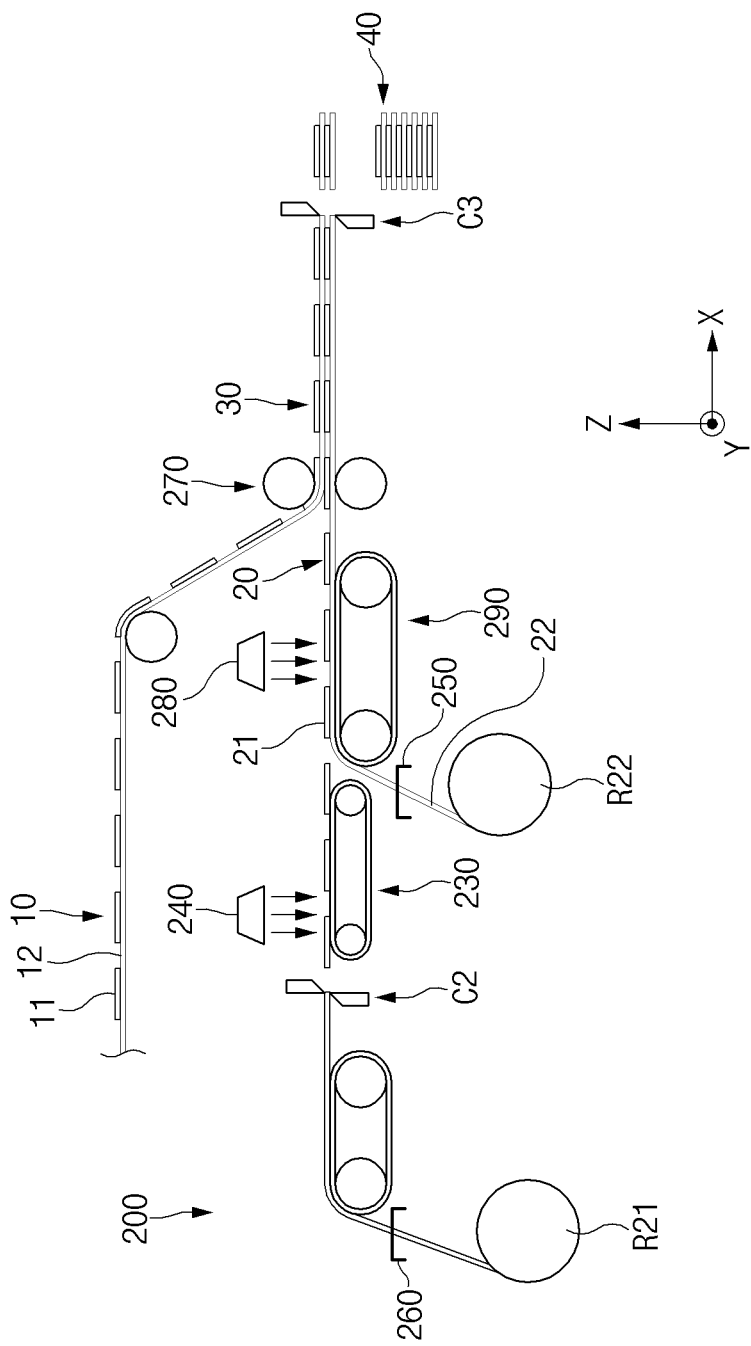
FIG. 5 is a conceptual front view illustrating a second combination device in the apparatus for manufacturing the electrode assembly according to an embodiment of the present invention.

FIG. 5 is a conceptual front view illustrating the second combination device in the apparatus for manufacturing the electrode assembly according to an embodiment of the present invention.

Referring to FIG. 5, in the method for manufacturing the electrode assembly according to an embodiment of the present invention, the second combination step comprises a second electrode cutting process of cutting the second electrode 21, a second electrode transfer process of transferring the second electrode 21, a first second-electrode position detection process of measuring a position of the second electrode 21, a second separator meandering correction process of moving the second separator 22 to correspond to the position of the second electrode 21 so as to correct a position of the second separator 22; a second stacking process of stacking the second electrode 21 on the second separator 22 of which the position is corrected, and a second bonding process of combining the first combination 10 with the second electrode 21 and the second separator 22 by applying heat and a pressure. In addition, the second combination step further comprises, after the second stacking process, a second second-electrode position detection process of detecting a deviation of the second electrode 21 and a second electrode meandering correction process of moving the second electrode 21 to correct the positional deviation of the second electrode 21.

In the second electrode cutting process, the second electrode 21 may be moved in an X-axis direction that is a progress direction and then be cut to a predetermined size to form a plurality of second electrodes. Here, in the second electrode cutting process, the second electrode 21 wound around a second electrode winding roll R21 may be unwound to be cut to a predetermined size so as to supply the cut second electrodes 21 in a subsequent process.

In the second electrode transfer process, the cut second electrodes 21 may be transferred. Here, in the second electrode transfer process, for example, the second electrodes 21 may be moved in the progress direction through a conveyor belt.

In the first second-electrode position detection process, a Y-axis position in a width direction of the second electrode 21, which is disposed in a path of the second electrode transfer process, may be measured.

Also, in the first second-electrode position detection process, positions of both ends of the second electrode 21 may be measured through a second master vision sensor to detect a position of a center of the second electrode 21.

In the second separator meandering correction process, the second separator 22 that is transferred in the progress direction to correspond to the Y-axis position of the second electrode 21, which is detected through the first second-electrode position detection process, may be moved to the Y-axis so as to be corrected in position. Here, in the second separator meandering correction process, the second separator 22 wound around a second separator winding roll R22 may be unwound to be moved.

Also, in the second separator meandering correction process, the second separator 22 may be moved to the Y-axis so that a position of a center of the second separator 22 corresponds to the position of the center of the second electrode 21, which is detected in the first second-electrode position detection process, through a second separator meandering correction part 250.

In the second stacking process, the second electrode 21 may be stacked on an upper portion of the second separator 22 that is corrected in position through the second separator meandering correction process.

In a second second-electrode position detection process, after the second stacking process, a position of the second electrode 21 in the Y-axis direction may be measured to detect a deviation from the reference position.

In the second electrode meandering correction process, the second electrode 21 may be moved in the Y-axis direction to correct the positional deviation of the second electrode 21, which is detected through the second second-electrode position detection process.

In the second bonding process, the first combination 10 may be combined with the second electrode 21 and the second separator 22 by applying heat and a pressure to form the second combination 30. Here, the first combination 10 may be combined with the upper portion of the second electrode 21 so that the first electrode 11 of the first combination 10 is combined at a position that faces the second electrode 21 with the first separator 12 therebetween.

Referring to FIGS. 2 and 5, in the method for manufacturing the electrode assembly having the above-described configuration, according to an embodiment of the present invention, when the plurality of electrodes and the plurality of separators are stacked to be combined with each other to manufacture an electrode assembly 40, the positions of the electrodes and the separators may be detected through the first and second first-electrode position detection parts 140 and 180 and the first and second second-electrode position detection parts 240 and 280 to automatically correct the positions through the first and second separator meandering correction parts 150 and 250 and the first and second electrode meandering correction parts 160 and 260, thereby preventing the Y-axis meandering from occurring and improving the positioning accuracy of the electrode and the separators, and thus, the electrode assembly 40 may be improved in quality.

Also, when the plurality of electrodes and the plurality of separators are stacked, after the first electrode 11 is combined with the first separator 12 to form the first combination 10, the first combination 10 may be combined with the second electrode 21 and the second separator 22 to form the second combination 30. As a result, the electrode traveling distance may be reduced to increase in manufacturing rate, thereby preventing the electrode meandering from occurring.

Hereinafter, a method for manufacturing an electrode assembly according to another embodiment of the present invention will be described.

Figure 6:
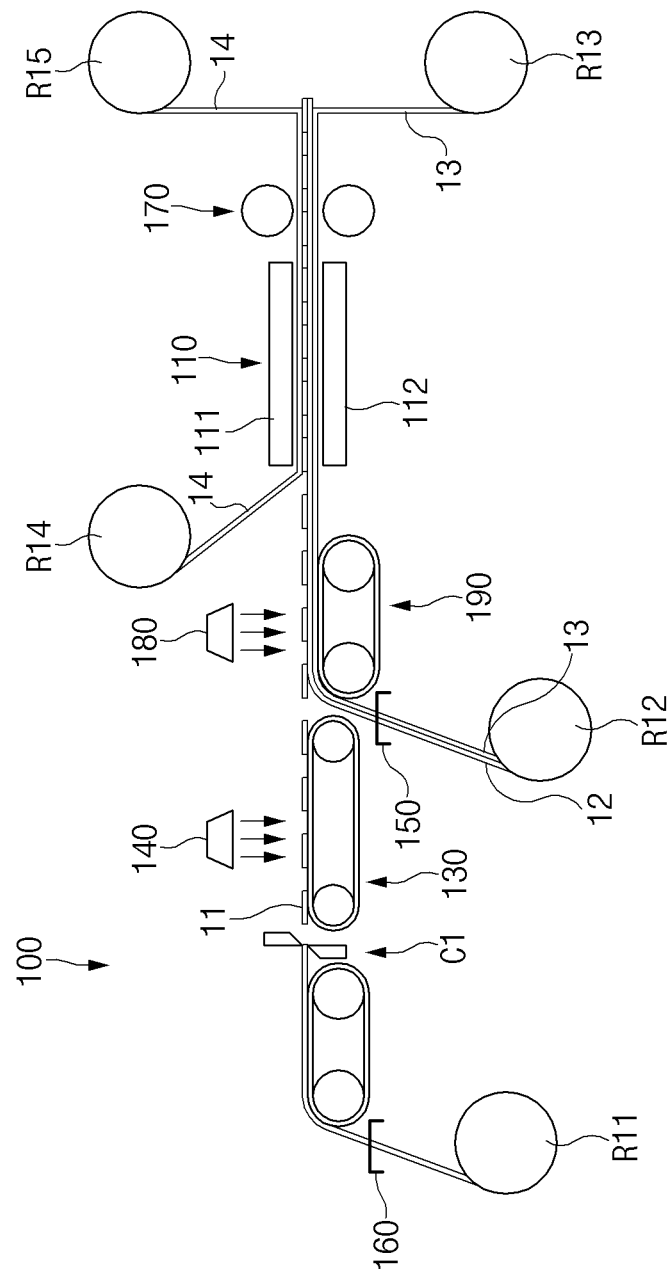
FIG. 6 is a conceptual front view illustrating a first combination device in an apparatus for manufacturing an electrode assembly according to another embodiment of the present invention.
Figure 7:
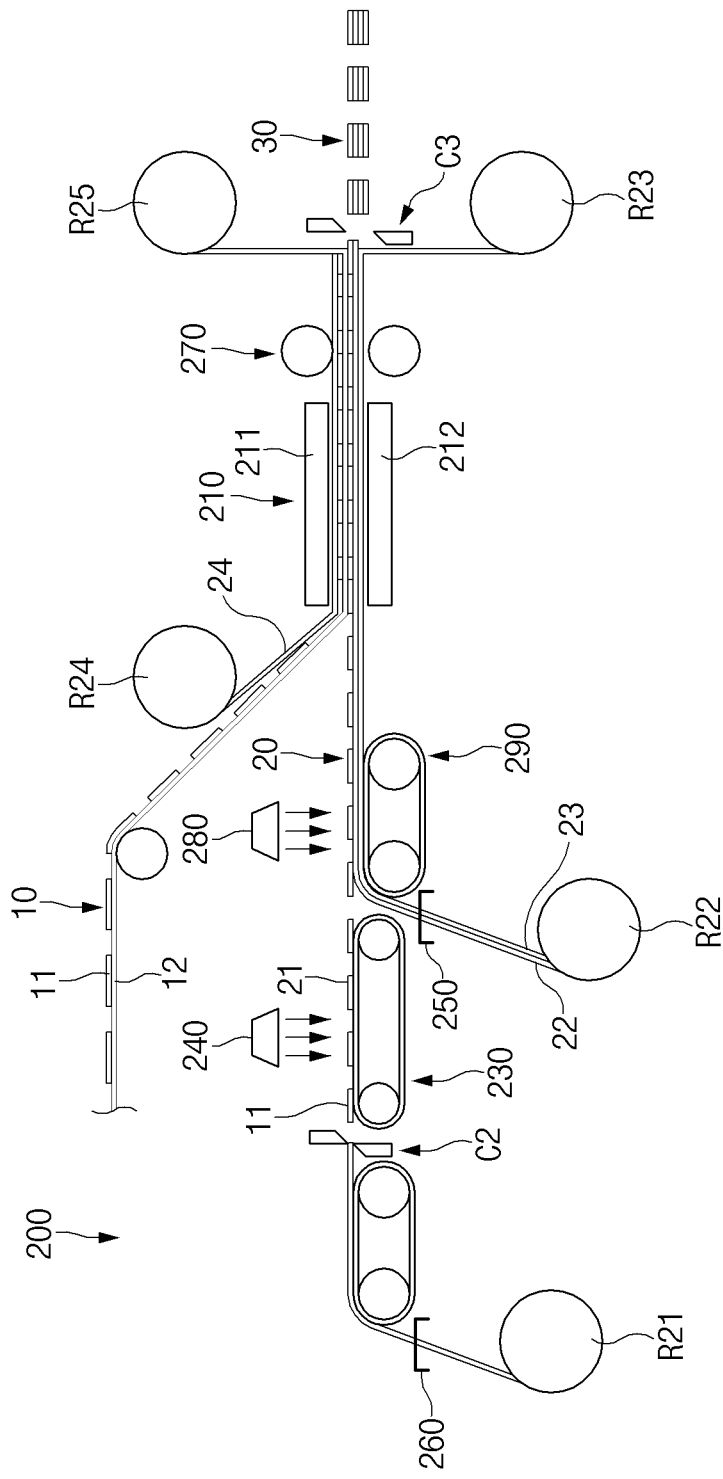
FIG. 7 is a conceptual front view illustrating a second combination device in the apparatus for manufacturing the electrode assembly according to another embodiment of the present invention.

FIG. 6 is a conceptual front view illustrating a first combination device in an apparatus for manufacturing an electrode assembly according to another embodiment of the present invention, and FIG. 7 is a conceptual front view illustrating a second combination device in the apparatus for manufacturing the electrode assembly according to another embodiment of the present invention.

Referring to FIGS. 6 and 7, a method for manufacturing an electrode assembly according to another embodiment of the present invention comprises a first combination step of forming a first combination 10 and a second combination step of combining the first combination 10 to form a second combination 30. Here, the first combination step comprises a first electrode cutting process of cutting a first electrode 11, a first electrode transfer process of transferring the first electrode 11, a first first-electrode position detection process of measuring a position of the first electrode 11, a first protective film combination process of combining a first protective film 13 with a lower portion of the first separator 12, a first separator meandering correction process of moving a first separator 12 to correspond to the position of the first electrode 11 so as to correct a position of the first separator 12, a first stacking process of stacking the first electrode 11 on the first separator 12 of which the position is corrected, a first bonding process of bonding the stacked first electrode 11 to the first separator 12, and a first protective film separation process of separating the first protective film 13 from the first separator 12 after the first bonding process. In addition, the first combination step further comprises, after the first stacking process, a second first-electrode position detection process of detecting a deviation of the first electrode 11 and a first electrode meandering correction process of moving the first electrode 11 to correct the positional deviation of the first electrode 11.

The method for manufacturing the electrode assembly according to another embodiment of the present invention is different from the method for manufacturing the electrode assembly according to the foregoing embodiment of the present invention in that the method further comprises the first protective film combination process and the first protective film separation process. Thus, in this embodiment, contents duplicated with those of the method for manufacturing the electrode assembly according to the foregoing embodiment will be omitted or briefly described.

In more detail, according to the method for manufacturing the electrode assembly according to another embodiment of the present invention, in the first lower protective film combination process, the first protective film 13 may be combined with a lower portion of the first separator 12 before the first separator meandering correction process. Here, the first protective film 13 may be made of, for example, a PET material. Here, in the first protective film combination process, for example, the first protective film 13 may be combined with the lower portion of the first separator 12 and then wound around a first separator winding roll R12.

In the first protective film separation process, the first protective film 13 may be separated from the first separator 12 after the first bonding process. Here, in the first protective film combination process, for example, the first protective film 13 may be separated from the lower portion of the first separator 12 and then wound around a first protective film winding roll R13.

The method for manufacturing the electrode assembly according to another embodiment of the present invention may further comprise a first upper protective film combination process of combining a first upper protective film 14 with an upper portion of the first electrode 11 before the first bonding process and a first upper protective film separation process of separating the first upper protective film 14 from the first electrode 11 after the first bonding process.

The method for manufacturing the electrode assembly according to another embodiment of the present invention may comprise a first heating process of heating the first electrode 11 and the first separator 12 through a first heater part 110 before the first bonding process. Here, the first heater part 110 may comprise a first upper heater part 111 and a first lower heater part 112. A stack of the first electrode 11 and the first separator 12 may pass between the first upper heater part 111 and the first lower heater part 112 to heat the first electrode 11 and the first separator 12.

Referring to FIG. 7, in the method for manufacturing the electrode assembly according to another embodiment of the present invention, the second combination step comprises a second electrode cutting process of cutting the second electrode 21, a second electrode transfer process of transferring the second electrode 21, a first second-electrode position detection process of measuring a position of the second electrode 21, a second separator meandering correction process of moving the second separator 22 to correspond to the position of the second electrode 21 so as to correct a position of the second separator 22, a second stacking process of stacking the second electrode 21 on the second separator 22 of which the position is corrected, and a second bonding process of combining the stacked second electrode 12 with the second separator 22 by applying heat and a pressure. In addition, the second combination step further comprises, after the second stacking process, a second second-electrode position detection process of detecting a deviation of the second electrode 21 and a second electrode meandering correction process of moving the second electrode 21 to correct the positional deviation of the second electrode 21. Here, in the method of manufacturing the electrode assembly according to another embodiment of the present invention, the second combination step may further comprise a second protective film combination process and a second protective film separation process.

Here, according to the method for manufacturing the electrode assembly according to another embodiment of the present invention, in the second protective film combination process, a second protective film 23 may be combined with a lower portion of the second separator 22 before the second separator meandering correction process. Here, the second protective film 23 may be made of, for example, a PET material. Here, in the second protective film combination process, for example, the second protective film 23 may be combined with the lower portion of the second separator 22 and then wound around a second separator winding roll R22.

In the second protective film separation process, the second protective film 23 may be separated from the second separator 22 after the second bonding process. Here, in the second protective film combination process, for example, the second protective film 23 may be separated from the lower portion of the second separator 22 and then wound around a second protective film winding roll R23.

The method for manufacturing the electrode assembly according to another embodiment of the present invention may further comprise a second upper protective film combination process of combining a second upper protective film 24 with an upper portion of the first electrode 11 before the second bonding process and a second upper protective film separation process of separating the second upper protective film 24 from the first electrode 11 after the second bonding process.

The method for manufacturing the electrode assembly according to another embodiment of the present invention may comprise a second heating process of heating the first combination 10, the second electrode 21 and the second separator 22 through a second heater part 210 before the second bonding process. Here, the second heater part 210 may comprise a second upper heater part 211 and a second lower heater part 212.

Hereinafter, an apparatus for manufacturing an electrode assembly according to an embodiment of the present invention will be described.

Referring to FIGS. 1 and 2, an apparatus for manufacturing an electrode assembly according to an embodiment of the present invention may be related to an apparatus for manufacturing an electrode assembly, to which the method for manufacturing the electrode assembly according to the foregoing embodiment is applied. Thus, contents of this embodiment, which are duplicated with those according to the foregoing embodiments, will be omitted or briefly described.

The apparatus for manufacturing the electrode assembly according to an embodiment of the present invention comprises a first combination device 100 for forming a first combination 10 and a second combination device 200 for forming a second combination 30. Here, the first combination device 100 comprises a first electrode cutting part C1 for cutting a first electrode 11, a first electrode transfer part 130 for transferring the cut first electrode 11, a first first-electrode position detection part 140 for measuring a position of the first electrode 11, a first separator meandering correction part 150 for moving a first separator 12 to correspond to the position of the first electrode 11 so as to correct a position of the first separator 12, a first stacking part 190 for stacking the first electrode 11 on the first separator 12, and a first bonding part 170 for bonding the stacked first electrode 11 to the first separator 12.

In addition, the first combination device 100 further comprises a second first-electrode position detection part for detecting a deviation of the first electrode 11 and a first electrode meandering correction part for moving the first electrode 11 to correct the positional deviation of the first electrode 11.

In more detail, referring to FIGS. 1 and 2, in the first combination device 100, the first electrode 11 may be combined with an upper portion of the first separator 12 to form a first combination 10.

The first electrode cutting part C1 may move the first electrode 11 in an X-axis direction that is a progress direction to cut the first electrode 11 to a predetermined size, thereby forming a plurality of first electrodes. Here, the first electrode cutting part C1 may cut the first electrode 11 wound around a first electrode winding roll R11 while unwinding the first electrode 11 to a predetermined size to supply the cut first electrodes 11 in a subsequent device.

The first electrode transfer part 130 may transfer the cut first electrodes 11. Here, the first electrode transfer part 130 may move the first electrodes 11 in the progress direction through, for example, a conveyor belt.

The first first-electrode position detection part 140 may measure a Y-axis position in a width direction of the first electrode 11, which is disposed on the first electrode transfer part 130.

Also, the first second-electrode position detection part 140 may measure positions of both ends of the first electrode 11 through a first master vision sensor to detect a position of a center of the first electrode 11.

Furthermore, the first first-electrode position detection part 140 may detect the position of the center of the first electrode 11 through the first master vision sensor and transfer a deviation value of the first electrode 11 to a controller C when a deviation from a reference position occurs.

Referring to FIGS. 2 and 3, the first separator meandering correction part 150 may move the first separator 12 that is transferred in the progress direction to correspond to the Y-axis position of the first electrode 11, which is detected through the first first-electrode position detection part 140, to the Y-axis to correct the position.

Also, the first separator meandering correction part 150 may move the first separator 12 to the Y-axis so that a position of a center of the first separator 12 corresponds to the position of the center of the first electrode 11, which is detected in the first first-electrode position detection part 140.

Also, the first separator meandering correction part 150 may move the first separator 12 to the Y-axis so that a position of a center of the first separator 12 corresponds to the position of the center of the first electrode 11, which is detected in the first first-electrode position detection process.

Furthermore, the first separator meandering correction part 150 may comprise a first separator CPC sensor 153, a first separator correction roller 151, and a first separator actuator 122.

The first separator CPC sensor 153 may detect the position of the center of the first separator 12 by measuring the positions of both the ends of the traveling first separator 12.

The first separator correction roller 151 may be in contact with the traveling first separator 12.

The first separator actuator 152 may move the first separator correction roller 151 in the Y-axis direction to move the first separator 12 so that the position of the center of the first separator 12 corresponds to the position of the center of the first electrode 11, which is detected in the first first-electrode position detection part 140.

The first stacking part may stack the first electrode 11 on an upper portion of the first separator 12 that is corrected in position through the first separator meandering correction part 150.

The second first electrode position detection part 180 may measure the Y-axis position of the first electrode 11 stacked on the first separator 12 via the first stacking part 190 to measure a deviation from the reference position.

Also, the second first-electrode position detection part 180 may measure positions of both ends of the first electrode 11 through a first feedback vision sensor to detect the position of the center of the first electrode 11, thereby detecting a deviation from the reference position.

Referring to FIGS. 2 and 4, the first electrode meandering correction part 160 may move the first electrode in the Y-axis direction to correct the positional deviation of the first electrode 11, which is detected through the second first-electrode position detection part 180.

Also, in the first electrode meandering correction part 160 may move the first electrode 11 to the Y-axis so that the deviation of the first electrode 11, which is detected in the second first-electrode position detection part 180, is collected.

Furthermore, the first electrode meandering correction part 160 may comprise a first electrode CPC sensor 163, a first electrode correction roller 161, and a first electrode actuator 162.

The first electrode CPC sensor 163 may detect the center position of the first electrode 11 by measuring the positions of both the ends of the traveling first electrode 11.

The first electrode correction roller 161 may be in contact with the traveling first electrode 11.

The first electrode actuator 162 may move the first electrode correction roller 161 in the Y-axis direction to move the first electrode 11 so that the deviation of the first electrode 11, which is detected by the second first electrode position detection part 180, is corrected.

Referring to FIG. 2, the first bonding portion 170 may bond the stacked first electrode 11 to the first separator 12 by applying heat and a pressure.

Here, the first bonding part 170 may comprise, for example, a pair of rollers. Thus, the first electrode 11 and the first separator 12 may be pressed to be bonded to each other while passing between the pair of rollers.

Referring to FIG. 5, after the second electrode 21 is stacked on the upper portion of the second separator 22, the second combination device 200 may combine the second electrode 21 with the first combination 10 so that the second electrode 21 faces the first electrode 11 with the first separator 12 therebetween to form a second combination 30.

Here, in the apparatus for manufacturing the electrode assembly according to an embodiment of the present invention, the second combination device 200 may comprise a second electrode cutting part C2 for cutting the second electrode 21, a second electrode transfer part 230 for transferring the cut second electrode 21, a first second-electrode position detection part 240 for measuring a position of the second electrode 21, a second separator meandering correction part 250 for moving the second separator 22 to correspond to the position of the second electrode 21 so as to correct a position of the second separator 22, a second stacking part 290 for stacking the second electrode 21 on the second separator 22, which is corrected in position through a second separator meandering correction part, and a second bonding part 270 for combining the first combination 10, the second electrode 21, and the second separator 22 with each other.

Also, the second combination device 200 may further comprise a second second-electrode position detection part 280 for detecting a deviation of the second electrode 21 after the second stacking part 290 performs the stacking operation and a second electrode meandering correction part 260 for moving the second electrode 21 to correct the positional deviation of the second electrode 21.

The second electrode cutting part C2 may move the first electrode 21 in an X-axis direction that is a progress direction to cut the second electrode 21 to a predetermined size, thereby forming a plurality of second electrodes. Here, the second electrode cutting part C2 may cut the second electrode 21 wound around a second electrode winding roll R21 while unwinding the second electrode 21 to a predetermined size to supply the cut second electrodes 21 in a subsequent device.

The second electrode transfer part 230 may transfer the cut second electrodes 21. Here, the second electrode transfer part 230 may move the second electrode 21 in the progress direction through, for example, a conveyor belt.

The second first-electrode position detection part 240 may measure a Y-axis position in a width direction of the first electrode 11, which is disposed on the first electrode transfer part 230.

The first second-electrode position detection part 240 may measure a Y-axis position in a width direction of the second electrode 21, which is disposed on the second electrode transfer part 230.

The second separator meandering correction part 250 may move the second separator 22 that is transferred in the progress direction to correspond to the Y-axis position of the second electrode 21, which is detected through the first second-electrode position detection part 240, to the Y-axis to correct the position.

Also, the second separator meandering correction part 250 may move the second separator 22 to the Y-axis so that a position of a center of the second separator 22 corresponds to the position of the center of the second electrode 21, which is detected in the first second-electrode position detection part 240. Here, since the second separator meander correction part 250 has the same configuration as the first separator meander correction part 150, a detailed description thereof will be omitted.

The second stacking part 290 may stack the second electrode 21 on an upper portion of the second separator 22 that is corrected in position through the second separator meandering correction part 250.

The second electrode position detection part 280 may measure the Y-axis position of the second electrode 21 after the second stack part 290 performs the stacking operation to detect a deviation from the reference position.

The second electrode meandering correction part 260 may move the second electrode 21 in the Y-axis direction to correct the positional deviation of the second electrode 21, which is detected through the second electrode position detection part 280. Here, since the second electrode meandering correction part 260 has the same configuration as the first electrode meandering correction part 160, a detailed description thereof will be omitted.

The second bonding part 270 may combine the first combination 10, the second electrode 21, and the second separator 22 to form a second combination 30.

Here, the first bonding part 270 may comprise, for example, a pair of rollers. Thus, the first combination 10, the second electrode 21, and the second separator 22 may be pressed to be bonded to each other while passing between the pair of rollers.

Here, the first combination 10 may be combined with the upper portion of the second electrode 21 so that the first electrode 11 of the first combination 10 is combined at a position that faces the second electrode 21 with the first separator 22 therebetween.

The apparatus for manufacturing the electrode assembly according to an embodiment of the present invention may further comprise a third cutting part C3 for cutting the second combination 30 at regular intervals. Thereafter, the plurality of second combinations 30 may be stacked to from an electrode assembly 40.

Hereinafter, an apparatus for manufacturing an electrode assembly according to another embodiment of the present invention will be described.

Referring to FIGS. 6 and 7, an apparatus for manufacturing an electrode assembly according to another embodiment of the present invention comprises a first combination device 100 for forming a first combination 10 and a second combination device 200 for forming a second combination 30. Here, the first combination device 100 comprises a first electrode cutting part C1 for cutting a first electrode 11, a first electrode transfer part 130 for transferring the cut first electrode 11, a first first-electrode position detection part 140 for measuring a position of the first electrode 11, a first separator meandering correction part 150 for moving a first separator 12 to correspond to the position of the first electrode 11 so as to correct a position of the first separator 12, a first stacking part 190 for stacking the first electrode 11 on the first separator 12, and a first bonding part 170 for bonding the stacked first electrode 11 to the first separator 12.

In addition, the first combination device 100 further comprises a second first-electrode position detection part for detecting a deviation of the first electrode 11 and a first electrode meandering correction part for moving the first electrode 11 to correct the positional deviation of the first electrode 11.

The apparatus for manufacturing the electrode assembly according to another embodiment of the present invention is different from the apparatus for manufacturing the electrode assembly according to the foregoing embodiment of the present invention in that the apparatus further comprises the first protective film combination part and the first protective film separation part. Thus, in this embodiment, contents duplicated with those of the apparatus for manufacturing the electrode assembly according to the foregoing embodiment will be omitted or briefly described.

In more detail, the first combination device 100 of the apparatus for manufacturing the electrode assembly according to another embodiment of the present invention may further comprise a first protective film combination part.

The first protective film combination part may comprise a first separator winding roll R12, around which the first protective film 13 combined with a lower portion of the first separator 12 is wound, and a second protective film winding roll R13 around which the first protective film 13 is wound after the first protective film 13 is separated from the lower portion of the first separator 12, which passes through a first stacking part 190 and a first bonding part 170 and is bonded to the first electrode 11.

Here, the first stacking part 190 may unwind the first separator 12 wound around the first separator winding roll R12 to stack the first electrode 11 on the first separator 12, and the first bonding part 170 may bond the stacked first electrode 11 to the first separator 12.

In the apparatus for manufacturing the electrode assembly according to another embodiment of the present invention, the first protective film combination part may further comprise a first upper protective film supply roll R14, to which the first upper protective film for further combining the first upper protective film 14 to the upper portion of the first electrode 11 stacked on the first separator 12 is supplied, and a first upper protective film winding roll R15 around which the first upper protective film 14 separated from the first electrode 11 is wound after the first electrode 11 is bonded to the first separator 12.

The apparatus for manufacturing the electrode assembly according to another embodiment of the present invention may further comprise a first heating part 110 for heating the first electrode 11 and the first separator 120 through a first heater part 110 before the first electrode 11 and the first separator 120 are bonded to each other. Here, the first heater part 110 may comprise a first upper heater part 111 and a first lower heater part 112. A stack of the first electrode 11 and the first separator 12 may pass between the first upper heater part 111 and the first lower heater part 112 to heat the first electrode 11 and the first separator 12.

Referring to FIG. 7, the second combination device 200 may combine the first combination 10 so that the second electrode 21 faces the first electrode 11 with the first separator 12 therebetween after the second electrode 21 is stacked on the second separator 22 to form a second combination 30.

The second combination device 200 may comprise a second electrode cutting part C2 for cutting the second electrode 21, a second electrode transfer part 230 for transferring the cut second electrode 21, a first second-electrode position detection part 240 for measuring a position of the second electrode 21, a second separator meandering correction part 250 for moving the second separator 22 to a Y-axis to correspond to the position of the second electrode 21 so as to correct a position of the second separator 22, a second stacking part 290 for stacking the second electrode 21 on the second separator 22 of which the position is corrected through the second separator meandering correction part 250, and a second bonding part 270 for combining the first combination 10, the second electrode 21, and the second separator 22.

Also, the second combination device 200 may further comprise a second second-electrode position detection part 280 for detecting a deviation of the second electrode 21 after the second stacking part 290 performs the stacking operation and a second electrode meandering correction part 260 for moving the second electrode 21 to correct the positional deviation of the second electrode 21.

Here, in the apparatus for manufacturing the electrode assembly according to another embodiment of the present invention, the second combination device 200 may further comprise a second protective film combination part.

The first protective film combination part may comprise a second separator winding roll R22, around which the second protective film 23 combined with a lower portion of the second separator 22 is wound, and a second protective film winding roll R23 around which the second protective film 23 is wound after the second protective film 23 is separated from the lower portion of the second separator 22, which passes through a second stacking part 290 and a second bonding part 270 and is bonded to the second electrode 21.

In the apparatus for manufacturing the electrode assembly according to another embodiment of the present invention, the second protective film combination part may further comprise a second upper protective film supply roll R24, to which the second upper protective film for further combining the second upper protective film 24 to the upper portion of the second electrode 21 stacked on the second separator 22 is supplied, and a second upper protective film winding roll R25 around which the second upper protective film 24 separated from the second electrode 21 is wound after the second electrode 21 is bonded to the second separator 22.

The apparatus for manufacturing the electrode assembly according to another embodiment of the present invention may comprise a second heating part for heating the first combination 10, the second electrode 21, and the second separator 22 before the second bonding process. Here, the second heater part 210 may comprise a second upper heater part 211 and a second lower heater part 212.

Manufacturing Example 1

A positive electrode was combined with an upper portion of a first separator through a first combination step to form a first combination, and a negative electrode was stacked on a second separator through a second combination step and then was combined with the first combination so that the negative electrode faces the positive electrode with the first separator therebetween to from a second combination. Also, a unit cell that is the second combination was cut at a regular intervals, and then, the plurality of unit cells were stacked to manufacture an electrode assembly.

Here, in the first combination step, the positive electrode was moved in an X-axis direction that is a progress direction and then was cut to a predetermined size to form a plurality of positive electrodes. Then, the cut positive electrodes were moved to measure a Y-axis position that is a width direction while transferring the positive electrodes.

Also, the first separator transferred in the progress direction was moved to the Y-axis so as to correspond to the measured Y-axis position of the positive electrode to correct meandering of the first separator. Then, the positive electrode was stacked on the first separator that is corrected in meandering, and the stacked positive electrode was bonded to the first separator by applying heat and a pressure.

Thereafter, the Y-axis position of the positive electrode was measured to detect a deviation from a reference position, and the positive electrode was moved in the Y-axis direction to correct the positional deviation of the positive electrode, thereby correcting the meandering of the positive electrode.

Comparative Example 1

A negative electrode was traveled, and a first separator and a second separator were combined with both surfaces of the traveling negative electrode to form a negative electrode combination, and a positive electrode was traveled and cut into a plurality of positive electrodes to be stacked on and combined with an upper portion of the negative electrode combination, thereby forming a combination. Also, a unit cell that is the combination was cut at a regular intervals, and then, the plurality of unit cells were stacked to manufacture an electrode assembly.

Comparative Example 1 is different from Manufacturing Example 1 in that a process of correcting meandering of each of the first separator and the positive electrode is not performed.

Also, in Comparative Example 1, the positive electrode was traveled before the cutting, and then the traveling positive electrode was cut and combined with the negative electrode combination. Here, the positive electrode was traveled for a long distance before the combination. On the other hand, in Manufacturing Example, the positive electrode was cut and then combined with the first separator. Here, the positive electrode was traveled for a short distance before the combination.

Experimental Example 1

The Y-axis meandering of the unit cells manufactured through Manufacturing Example 1 and Comparative Example 1 was measured.

In Manufacturing Example 1, a standard deviation was 0.11 to 0.12. On the other hand, in Comparative Example 1, a standard deviation was 0.15. That is, it is seen that the Y-axis meandering in Manufacturing Example 1 is improved by about 30% compared to Comparative Example 1.

Also, capability of process (CP) in Manufacturing Example 1 was 2.47 to 2.87, and in Comparative Example 1, the CP was 1.64 to 2.18. That is, it is seen that the CP in Manufacturing Example 1 is improved by about 0.63 to 0.83 compared to Comparative Example 1.

Therefore, it is seen that the electrode assembly manufactured according to the embodiment of the present invention, in which the meandering correction process is performed according to Manufacturing Example 1, is significantly reduced in Y-axis meandering when compared to the electrode assembly manufactured according to the related art, in which the meandering correction process is not performed according to Comparative Example 1. As a result, it is seen that positioning accuracy is improved to improve quality of the electrode assembly in Manufacturing Example 1.

Experimental Example 2

An X-axis interval between the unit cells manufactured through Manufacturing Example 1 and Comparative Example 1 was measured.

In Manufacturing Example 1, a standard deviation was 0.06 to 0.07. On the other hand, in Comparative Example 1, a standard deviation was 0.13 to 0.16. That is, it is seen that the X-axis interval in Manufacturing Example 1 is improved by about 122% compared to Comparative Example 1.

Also, capability of process (CP) in Manufacturing Example 1 was 3.37 to 3.87, and in Comparative Example 1, the CP was 1.45 to 1.74. That is, it is seen that the CP in Manufacturing Example 1 is improved by about 1.92 to 2.13 compared to Comparative Example 1.

Therefore, it is seen that the electrode assembly manufactured according to the embodiment of the present invention, in which the traveling distance of the electrode is short in Manufacturing Example 1, is significantly constant when compared to the electrode assembly manufactured according to the related art, in which the traveling distance of the electrode is long in Comparative Example 1. As a result, it is seen that the electrode assembly is capable of being improved in quality in Manufacturing Example 1 in which a tension loss is not generated due to the decrease in traveling distance of the electrode.

While the present invention has been particularly shown and described with reference to exemplary embodiments thereof, it is to be understood that the scope of the present invention is not limited to the apparatus and method for the electrode assembly according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10: First combination
11: First electrode
12: First separator
21: Second electrode
22: Second separator
30: Second combination
40: Electrode assembly
100: First combination device 110:
First heater part
130: First electrode transfer part
140: First first-electrode position detection part
150: First separator meandering correction part
160: First electrode meandering correction part
170: First bonding part
180: Second first-electrode position detection part
190: First stacking part
200: Second combination device
210: Second heater part
230: Second electrode transfer part
240: First second-electrode position detection part
250: Second separator meandering correction part
260: Second electrode meandering correction part
270: Second bonding part
280: Second second-electrode position detection part
290: Second stacking part
R11: First electrode winding roll
R12: First separator winding roll
R21: Second electrode winding roll
R22: Second separator winding roll
C1: First electrode cutting part
C2: Second electrode cutting part
C3: Third cutting part
C: Controller

The invention claimed is:

1. A method for manufacturing an electrode assembly, the method comprising:
   a first combination step of combining a first electrode with an upper portion of a continuous first separator to form a first combination; and
   after stacking a second electrode on a continuous second separator, a second combination step of combining the first combination with the second electrode and the continuous second separator so that the second electrode contacts a lower portion of the continuous first separator in the first combination;
   wherein the first combination step comprises:
      a first electrode cutting process to form a cut first electrode having a predetermined size while moving the first electrode in an X-axis direction that is a progress direction;
      a first electrode transfer process of transferring the cut first electrode in the X-direction;
      a first first-electrode position detection process of measuring a Y-axis position along a Y-axis direction of the cut first electrode during the first electrode transfer process, wherein the Y-axis direction is perpendicular to the X-axis direction;
      while transferring the continuous first separator in the X-direction, a first separator meandering correction process of moving the continuous first separator in the Y-axis direction to the Y-axis position of the cut first electrode, wherein the first separator correction process is carried out by a first separator meandering part configured to move the first continuous separator to any Y-axis position measured for the first cut electrode during the first-first-electrode detection process;
      a first stacking process of stacking the cut first electrode on the continuous first separator at the Y-axis position; and
      a first bonding process of bonding the stacked cut first electrode to the continuous first separator by applying heat and pressure to form the first combination.

2. The method of claim 1, wherein, positions of opposite sides of the cut first electrode are measured through a first master vision sensor to detect a center position of the cut first electrode in the first first-electrode position detection process, and
   wherein, in the first separator meandering correction process, the continuous first separator is moved with a first separator meandering part so that a center position of the continuous first separator corresponds to the center position of the cut first electrode.

3. The method of claim 2, wherein, in the first separator meandering correction process, positions of sides of the continuous first separator are measured with a first separator center position control (CPC) sensor to detect the center position of the continuous first separator, and a first separator correction roller that is in contact with the continuous first separator is moved in the Y-axis direction with a first separator actuator to move the continuous first separator so that the center position of the first separator corresponds to the position of the center position of the cut first electrode.

4. The method of claim 3, wherein, when a deviation of the center position of the cut first electrode from a reference position occurs, a deviation value of the cut first electrode is transmitted to a controller, and wherein, in the first separator meandering correction process, the controller controls the first separator actuator to move the first separator correction roller so that the continuous first separator is moved to correspond to the deviation value of the first electrode.

5. The method of claim 1, wherein the first combination step further comprises, after the first stacking process:

a second first-electrode position detection process of measuring the Y-axis position of the cut first electrode to detect a deviation from a reference position; and a first electrode meandering correction process of moving the first electrode in the Y-axis direction, prior to the first electrode cutting process, so the deviation of the first electrode is corrected.

6. The method of claim 5, wherein, in the second first-electrode position detection process, positions of opposite sides of the cut first electrode are measured through a first feedback vision sensor to detect a center position of the cut first electrode, thereby detecting the deviation from the reference position.

7. The method of claim 6, wherein, in the first electrode meandering correction process, positions of opposite sides of the first electrode are measured with a first electrode CPC sensor to detect the center position of the first electrode prior to the first electrode cutting process, and while the first electrode is travelling in the X-direction, a first electrode correction roller that is in contact with the first electrode is moved in the Y-axis direction with a first electrode actuator to move the first electrode so that the deviation of the first electrode is corrected prior to the first electrode cutting process.

8. The method of claim 7, wherein, in the second first-electrode position detection process, the deviation of the cut first electrode is transmitted to a controller, and wherein, in the first electrode meandering correction process, the controller controls the first electrode actuator to move the first electrode correction roller so that the first electrode is moved to correct the deviation of the first electrode prior to the first electrode cutting process.

9. The method of claim 1, wherein the first combination step further comprises:

a first protective film combination process of combining a first protective film with the lower portion of the continuous first separator before the first separator meandering correction process; and a first protective film separation process of separating the first protective film from the continuous first separator after the first bonding process.

10. The method of claim 1, wherein the second combination step comprises:

a second electrode cutting process of cutting the second electrode to a predetermined size while moving the second electrode in the X-axis direction to form a plurality of cut second electrodes;

a second electrode transfer process of transferring the cut second electrodes in the X-direction;

a first second-electrode position detection process of measuring a second Y-axis position of the cut second electrodes along the Y-axis direction during the second electrode transfer process;

while transferring the continuous second separator in the X-direction, a second separator meandering correction process of moving the continuous second separator in the Y-axis direction to correspond to the second Y-axis position of the cut second electrodes;

a second stacking process of stacking the cut second electrodes on the continuous second separator at the second Y-axis position; and a second bonding process of bonding the first combination with the second electrode and the continuous second separator.

11. The method of claim 10, wherein positions of opposite sides of the cut second electrodes are measured through a second master vision sensor to detect a center position of the cut second electrodes in the first second-electrode position detection process, wherein, in the second separator meandering correction process, the continuous second separator is moved with a second separator meandering correction part so that a center position of the continuous second separator corresponds to the center position of the cut second electrodes.

12. The method of claim 10, wherein the second combination step further comprises, after the second stacking process:

a second second-electrode position detection process of measuring the second Y-axis position of the cut second electrodes to detect a deviation from a second reference position; and a second electrode meandering correction process of moving the second electrode in the Y-axis direction so that the deviation from the second reference position is corrected prior to the second electrode cutting process.

13. The method of claim 10, wherein the second combination step further comprises:

a second protective film combination process of combining a second protective film with a lower portion of the continuous second separator before the second separator meandering correction process; and a second protective film separation process of separating the second protective film from the continuous second separator after the second bonding process.

* * * * *